(12) United States Patent
Jin et al.

(10) Patent No.: US 9,380,438 B2
(45) Date of Patent: Jun. 28, 2016

(54) METHOD AND DEVICE FOR FORWARDING AN INCOMING CALL ACCORDING TO A REMAINING BATTERY CAPACITY

(71) Applicant: Samsung Electronics Co., Ltd., Gyeonggi-do (KR)

(72) Inventors: Pyeong-Gyu Jin, Gyeonggi-do (KR); Jae-Chan Koh, Gyeonggi-do (KR); Jung-Hyung Kim, Gyeonggi-do (KR); Jong-Hyun Park, Gyeonggi-do (KR); Jae-Bong Chun, Gyeonggi-do (KR); Yoon-Jeong Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 10 days.

(21) Appl. No.: 14/246,567

(22) Filed: Apr. 7, 2014

(65) Prior Publication Data

US 2014/0302833 A1 Oct. 9, 2014

(30) Foreign Application Priority Data

Apr. 5, 2013 (KR) .................. 10-2013-0037457

(51) Int. Cl.
*H04W 52/02* (2009.01)
*H04W 4/16* (2009.01)
*H04M 1/725* (2006.01)
*H04M 1/00* (2006.01)

(52) U.S. Cl.
CPC ............ *H04W 4/16* (2013.01); *H04M 1/72577* (2013.01); *H04W 52/0277* (2013.01); *H04M 1/006* (2013.01)

(58) Field of Classification Search
CPC ................................ H04W 52/02; H04W 4/16
USPC ................................................ 455/412.2, 417
See application file for complete search history.

(56) References Cited

U.S. PATENT DOCUMENTS

| 2007/0287438 A1* | 12/2007 | Hansen et al. .......... H04M 3/54 455/417 |
| 2008/0311961 A1 | 12/2008 | Cotevino et al. |
| 2009/0191850 A1* | 7/2009 | Cardwell, III et al. .................. G08B 25/016 455/12.2 |

* cited by examiner

*Primary Examiner* — Michael T Vu
(74) *Attorney, Agent, or Firm* — The Farrell Law Firm, P.C.

(57) ABSTRACT

A method and device are provided for forwarding an incoming call according to a remaining battery capacity. The method includes determining that the remaining battery capacity is below a threshold; providing an indication that the remaining battery capacity is below the threshold and that a call forwarding function may be set; receiving an input from a user to select a contact number; and sending, to an adjacent base station, a request for call forwarding an incoming call to the selected contact number.

10 Claims, 10 Drawing Sheets

METHOD AND DEVICE FOR FORWARDING AN INCOMING CALL ACCORDING TO A REMAINING BATTERY CAPACITY

PRIORITY

This application claims priority under 35 U.S.C. §119(a) to Korean Patent Application Serial No. 10-2013-0037457, which was filed in the Korean Intellectual Property Office on Apr. 5, 2013, the entire disclosure of which is incorporated herein by reference.

BACKGROUND OF THE INVENTION

1. Field of the Invention

The present invention relates generally to a method and a device for forwarding an incoming call according to a remaining battery capacity.

2. Description of the Related Art

With the increased functionality of electronic devices, e.g., Internet search services, game services, Social Networking Services (SNSs), etc., battery consumption has also increased. Consequently, battery capacity has become an important issue.

For example, when a user needs to make an important call from a device with little remaining battery capacity, the user may feel a sense of unease about whether or not to make (or receive) the call with the device.

SUMMARY OF THE INVENTION

The present invention is has been made to address at least the above-mentioned problems and/or disadvantages and to provide at least the advantages described below.

Accordingly, an aspect of the present invention is to provide an apparatus and method for determining a remaining battery capacity and forwarding an incoming call to a set contact number, when the remaining battery capacity is less than a threshold.

Another aspect of the present invention is to provide an apparatus and method for by automatically releasing call forwarding, when it is determined that a remaining battery capacity is greater than a threshold.

In accordance with an aspect of the present invention, a method is provided for setting call forwarding in an electronic device based on a remaining battery capacity. The method includes determining that the remaining battery capacity is below a threshold; providing an indication that the remaining battery capacity is below the threshold and that a call forwarding function may be set; receiving an input from a user to select a contact number; and sending, to an adjacent base station, a request for call forwarding an incoming call to the selected contact number.

In accordance with another aspect of the present invention, a method is provided for receiving a forwarded call by an electronic device. The method includes identifying an incoming call as the forwarded call; providing a notification of the forwarded call; and receiving, from a user of the electronic device, an input selecting whether or not to receive the forwarded call.

In accordance with another aspect of the present invention, an electronic device is provided, which includes a processor for determining that a remaining battery capacity is below a threshold; a touch screen for providing an indication that the remaining battery capacity is below the threshold and that a call forwarding function may be set, and for receiving an input from a user to select a contact number; and a communication module for sending, to an adjacent base station, a request for call forwarding an incoming call to the selected contact number.

In accordance with another aspect of the present invention, an electronic device is provided, which includes a communication module for receiving an incoming call from an adjacent base station; a processor unit for identifying the incoming call as a forwarded call; and a touch screen for providing a notification of the forwarded call, and for receiving, from a user of the electronic device, an input selecting whether or not to receive the forwarded call.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE INVENTION

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Figure 1:
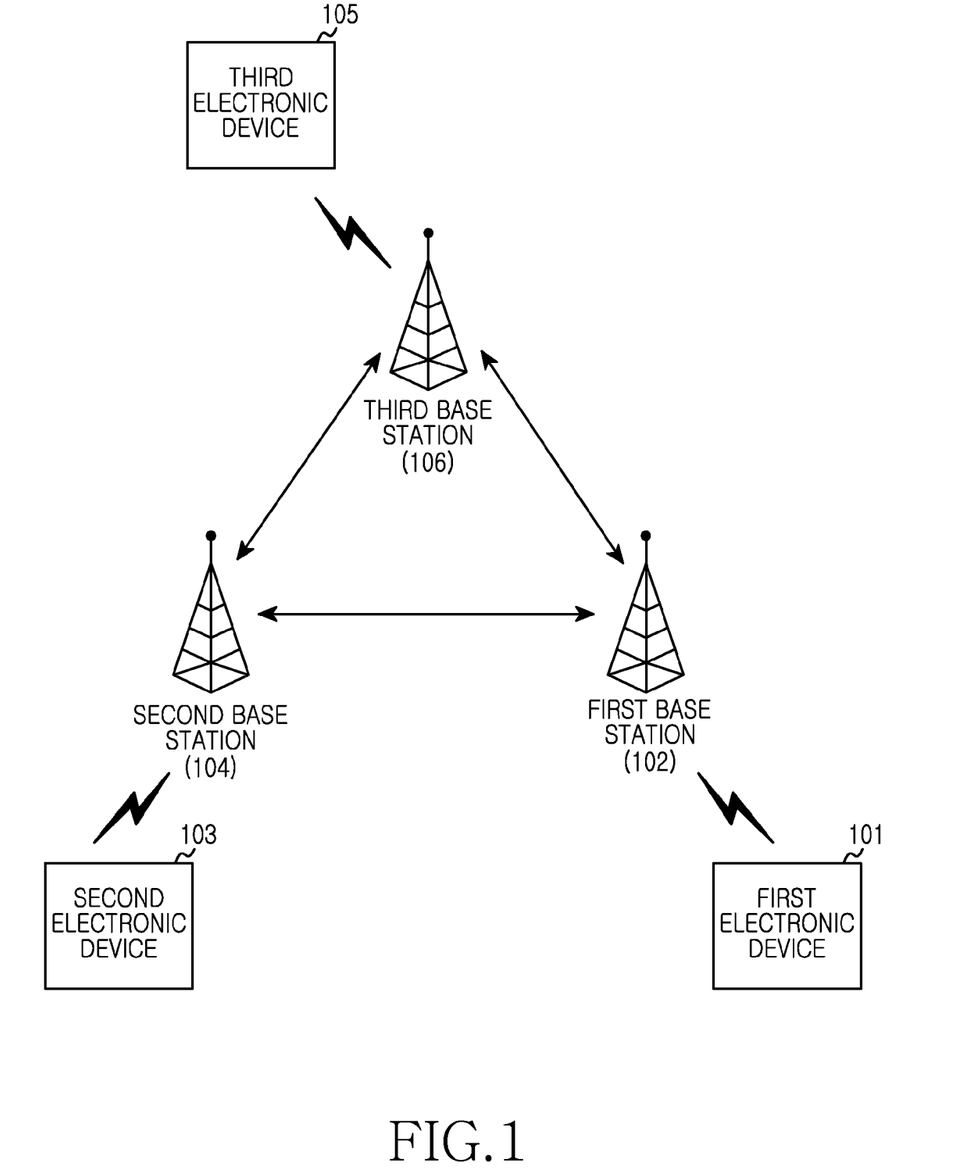
FIG. 1 illustrates an electronic device forwarding an incoming call according to a remaining battery capacity according to an embodiment of the present invention.

FIG. 1 illustrates an electronic device forwarding an incoming call according to a remaining battery capacity according to an embodiment of the present invention.

Referring to FIG. 1, a first electronic device 101 communicates through a first base station 102, a second electronic device 103 communicates through a second base station 104, and a third electronic device 105 communicates through a third base station 106.

The first electronic device 101 determines whether its remaining battery capacity is less than a threshold, e.g., at regular time intervals. For example, the threshold may be set by a user or manufacturer.

When it is determined that the remaining battery capacity is less than the threshold, the first electronic device 101 provides call forwarding feedback including information for informing the user that a call forwarding function is available. For example, when it is determined that the remaining battery capacity is less than the threshold, the first electronic device 101 may display notification information including information indicating that the remaining battery capacity has fallen below the threshold and information indicating that the user may set the call forwarding function. Also, the first electronic device 101 may audibly reproduce the information indicating that the user may set the call forwarding function through a speaker.

For example, when the threshold of the battery is set to 30% in the first electronic device 101, and it is determined that the remaining battery capacity is less than 30%, the first electronic device 101 displays information indicating that the remaining battery capacity is insufficient and information indicating that the user may set the call forwarding function on a touch screen. Herein, the call forwarding function forwards an incoming call to a set electronic device.

When a command to set the call forwarding function is received, the user selects a previously registered contact number or enters new contact number. For example, when a command to set the call forwarding function is received from the user, the first electronic device 101 may display a list of contact numbers registered on a contact number list and then receive a user selection of any one of the one displayed contact numbers, or may present a field in which a user can enter a new contact number.

After the contact number is selected or entered, the first electronic device 101 forwards the number to the first station 102 numbering response to a call forwarding request. Thereafter, the first electronic device 101 may receive feedback about the requested call forwarding from the first base station 101.

For example, when the user of the first electronic device 101 sets the call forwarding function to the second electronic device 103, the first electronic device 101 may receive feedback about the call forwarding from the first base station 102, and display a notification message indicating the approval of the call forwarding, e.g., a message that the call forwarding function is set to the second electronic device 103. Additionally, the notification message may also be output through a speaker.

Thereafter, the first electronic device 101 may automatically release the set call forwarding according to a change of the remaining capacity of the battery. For example, when the user of the first electronic device 101 changes the battery thereof and it is determined that the remaining battery capacity is now greater than or equal to the threshold, the first electronic device 101 may automatically request a release of the call forwarding from the first base station 102. That is, when it is determined that the remaining battery capacity is now greater than or equal to the threshold, e.g., by checking the remaining battery capacity a regular intervals, the first electronic device 101 determines that it has now has sufficient battery capacity to receive calls directly and requests the release of the call forwarding.

Again, the first electronic device 101 may receive feedback about the requested release of the call forwarding from the first base station 102. For example, the first electronic device 101 may receive the feedback about the release of the call forwarding from the first base station 102, and display a notification message indicating that the call forwarding function to the second electronic device 103 has been released.

While the call forwarding is set, the third electronic device 105 calls the first electronic device 101. However, because the first electronic device 101 is currently forwarding incoming calls to the second electronic device 103, the second electronic device 103 receives an incoming call notification through the second base station 104. The detailed process may differ according to settings of a service provider.

For example, the incoming call notification maybe sent through the second base station 104 from the third base station 106 or the first base station 102.

Thereafter, the user of the second electronic device 103 may determine whether to receive the forwarded call. For example, the second electronic device 103 may determine whether an incoming call is a direct call thereto or a forwarded call. When the call is a direct call, the second electronic device 103 operates normally. However, when the incoming is a forwarded call, the second electronic device 103 displays a notification that the incoming call is a forwarded call and requests the user to input a selection of whether or not to receive the forwarded call.

More specifically, the second electronic device 103 may display notification information indicating that an incoming call is a forwarded call from the first electronic device 101.

The second electronic device 103 also displays a request for the user to select whether or not to receive the forwarded call. For example, the second electronic device 103 may instruct the user to select a call button to accept the forwarded call or to select a reject button to reject the forwarded call.

FIGS. 2A to 2D illustrate examples of screens that are displayed when setting a call forwarding function according to an embodiment of the present invention.

Figure 2A:
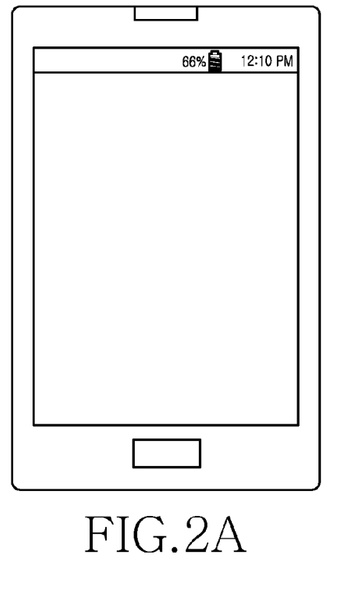
FIGS. 2A to 2D illustrate examples of screens that are displayed when setting a call forwarding function according to an embodiment of the present invention.

Referring to FIG. 2A, an electronic device determines, e.g., at regular intervals, whether a remaining battery capacity is less than a threshold. For example, the threshold in the electronic device maybe 20%.

Figure 2B:
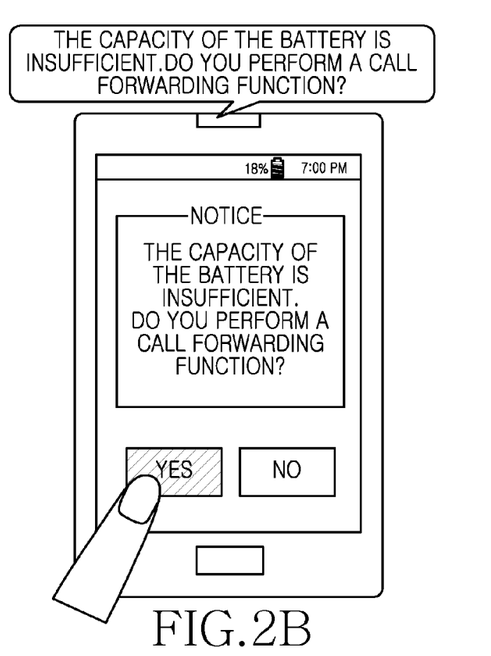

Referring to FIG. 2B, when it is determined that the remaining battery capacity (18%) is less than the threshold (20%), the electronic device provides call forwarding feedback including information indicating that a user may set a call forwarding function. More specifically, the electronic device displays notification information including information indicating that the remaining battery capacity is less than the threshold and information indicating that the user may set the call forwarding function. Further, the notification information may also be audibly provided through a speaker.

Figure 2C:
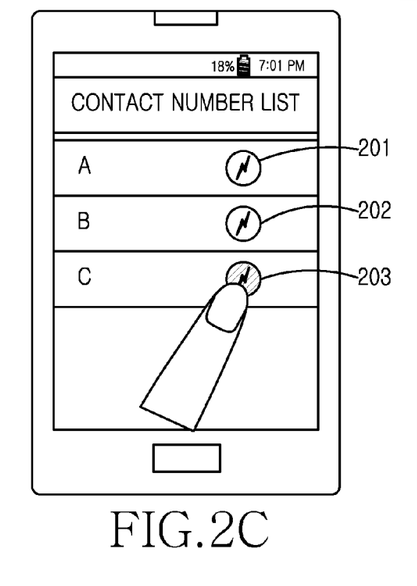

When a command to perform the call forwarding function is input, as illustrated in FIG. 2B, the electronic device displays a contact number list, as illustrated in FIG. 2C. For example, the electronic device displays contact numbers for users or devices "A", "B", and "C" on the contact number list. Although not illustrated, the electronic device may also display a field for the user to enter a contact number.

In FIG. 2C, forwarding icons 201 to 203 are displayed for each of the contact numbers. Herein, each of the call forwarding icons 201 to 203 may be selected to forward an incoming call to the corresponding contact number.

As illustrated in FIG. 2C, when the call forwarding icon 203 with contact number of "C" is selected, the electronic device sets the call forwarding function to the contact number provided to "C".

Figure 2D:
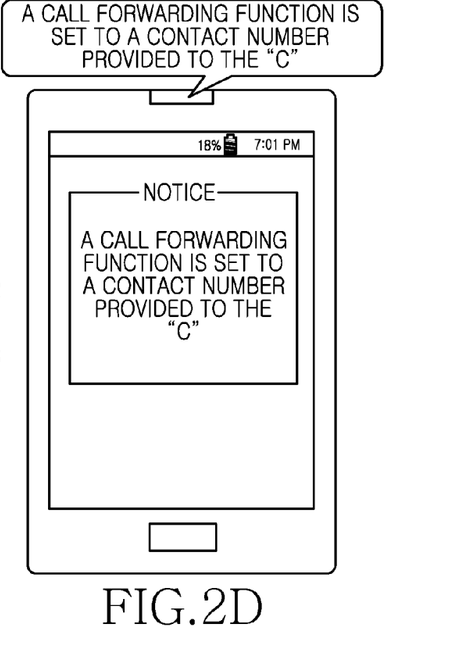

As described above, the electronic device sends a request for call forwarding to an adjacent base station and then receives feedback about the requested call forwarding from the adjacent base station. As illustrated in FIG. 2D, the electronic device receives the feedback about the call forwarding function from the adjacent base station, and displays a notification message of the feedback information indicating that the call forwarding function is set to the contact number of C. Additionally, the electronic device reproduces content of the notification message through the speaker.

Thereafter, a call made to the electronic device will be forwarded to the electronic device of "C", even if the power of the electronic device is subsequently turned off.

Figure 3A:
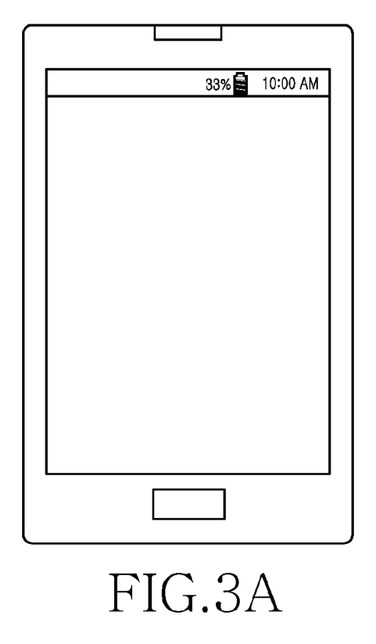
FIGS. 3A and 3B illustrate examples of screens that are displayed when releasing a call forwarding function according to an embodiment of the present invention.
Figure 3B:
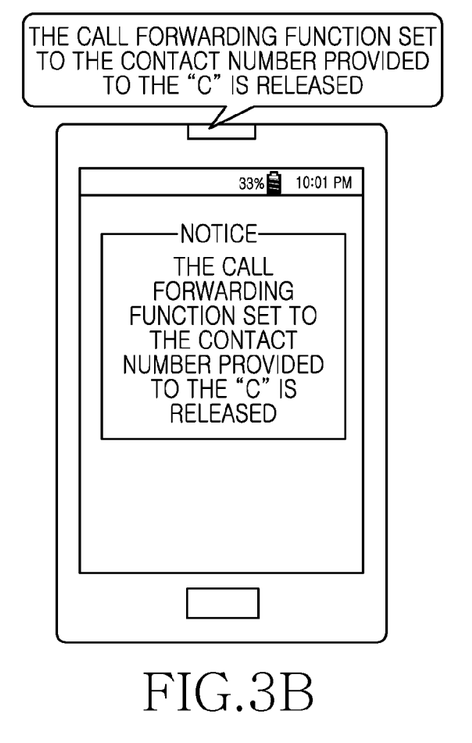

FIGS. 3A and 3B illustrate examples of screens that are displayed when releasing a call forwarding function according to an embodiment of the present invention.

Referring to FIG. 3A, when a call forwarding function is set, an electronic device determines, e.g., at regular intervals, the remaining battery capacity. For example, electronic device determines the remaining battery capacity every 10 minutes, to determine if the remaining battery capacity is at least 30%.

When the remaining battery capacity is at least 30%, the electronic device automatically sends a request to release the call forwarding to an adjacent base station, as the electronic device now has sufficient battery power to receive a telephone call or a text message. Alternatively, the electronic device may first query the user as to whether or not it should send a request to release the call forwarding, when the remaining battery capacity is at least 30%.

As illustrated in FIG. 3B, the electronic device receives feedback about the requested release of the call forwarding from the adjacent base station, and displays a notification message indicating that the call forwarding function has been released. Again, the notification message may also be output through a speaker.

Figures 4A, 4B:
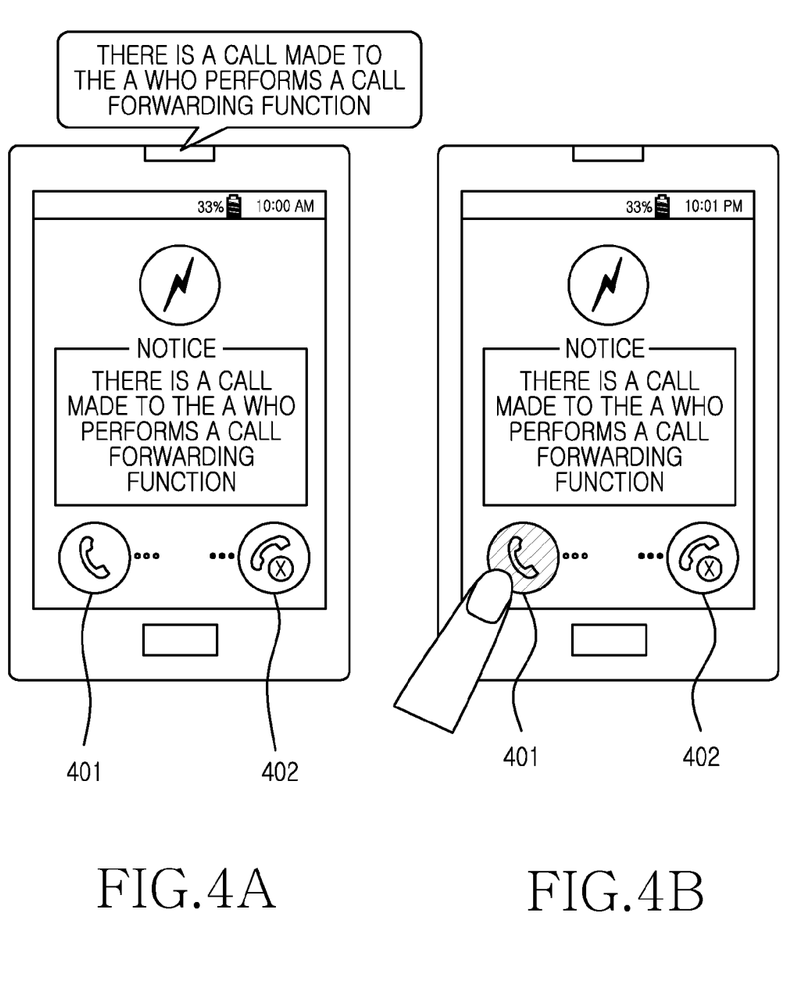
FIGS. 4A and 4B illustrate examples of screens that are displayed when receiving a forwarded call by an electronic device according to an embodiment of the present invention.

FIGS. 4A and 4B illustrate examples of screens that are displayed when receiving a forwarded call by an electronic device according to an embodiment of the present invention. In FIGS. 4A and 4B, call forwarding is set to the electronic device from an electronic device of user "A".

When a call is made to the electronic device of user "A", the network forwards the incoming call to the electronic device illustrated in FIG. 4A. As illustrated in FIG. 4A, the electronic device displays notification information including information indicating that a call to user "A" is being forwarded to the electronic device. The electronic device also audibly reproduces the information indicating that the call is being forwarded through as speaker.

The electronic device also displays a call button 401 for accepting the call and a reject button 402 for rejecting the call.

When the call button 401 is pushed, as illustrated in FIG. 4B, the electronic device receives the forwarded call.

Figure 5A:
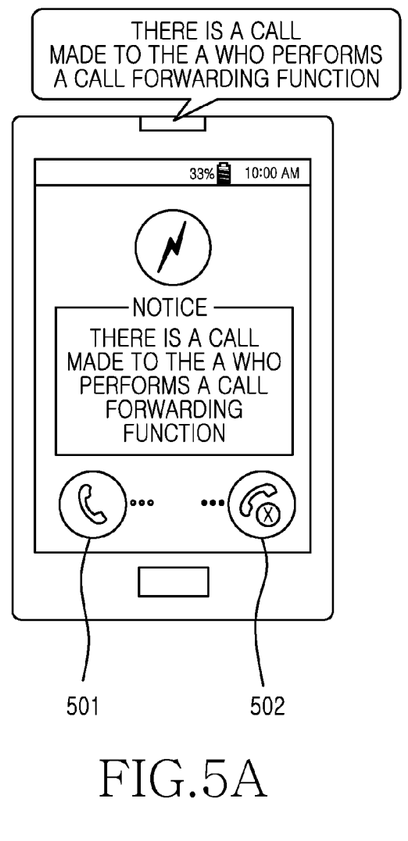
FIGS. 5A and 5B illustrate examples of screens that are displayed when rejecting a forwarded call made by an electronic device according to an embodiment of the present invention.
Figure 5B:
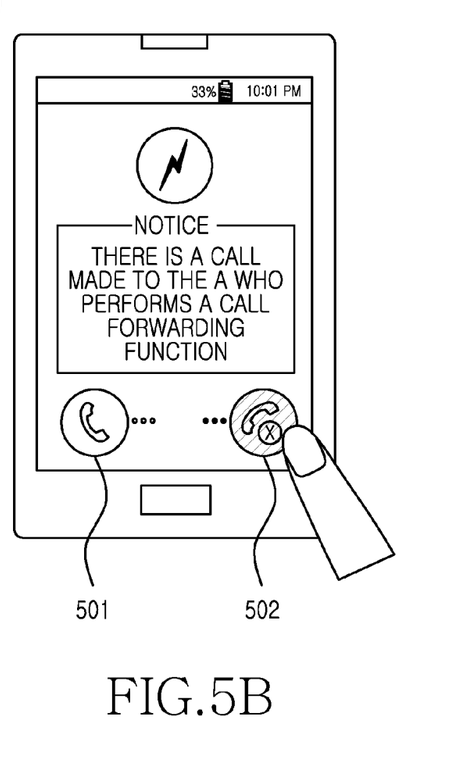

FIGS. 5A and 5B illustrate examples of screens that are displayed when rejecting a forwarded call made by an electronic device according to an embodiment of the present invention.

When a call is made to the electronic device of user "A", the network forwards the incoming call to the electronic device illustrated in FIG. 5A. As illustrated in FIG. 5A, the electronic device displays notification information including information indicating that a forwarded call is being received. Further, the electronic device displays a call button 501 for accepting the forwarded call and a reject button 502 for rejecting the forwarded call.

When the reject button 502 is pushed, as illustrated in FIG. 5B, the electronic device rejects the reception of the forwarded call.

Figure 6:
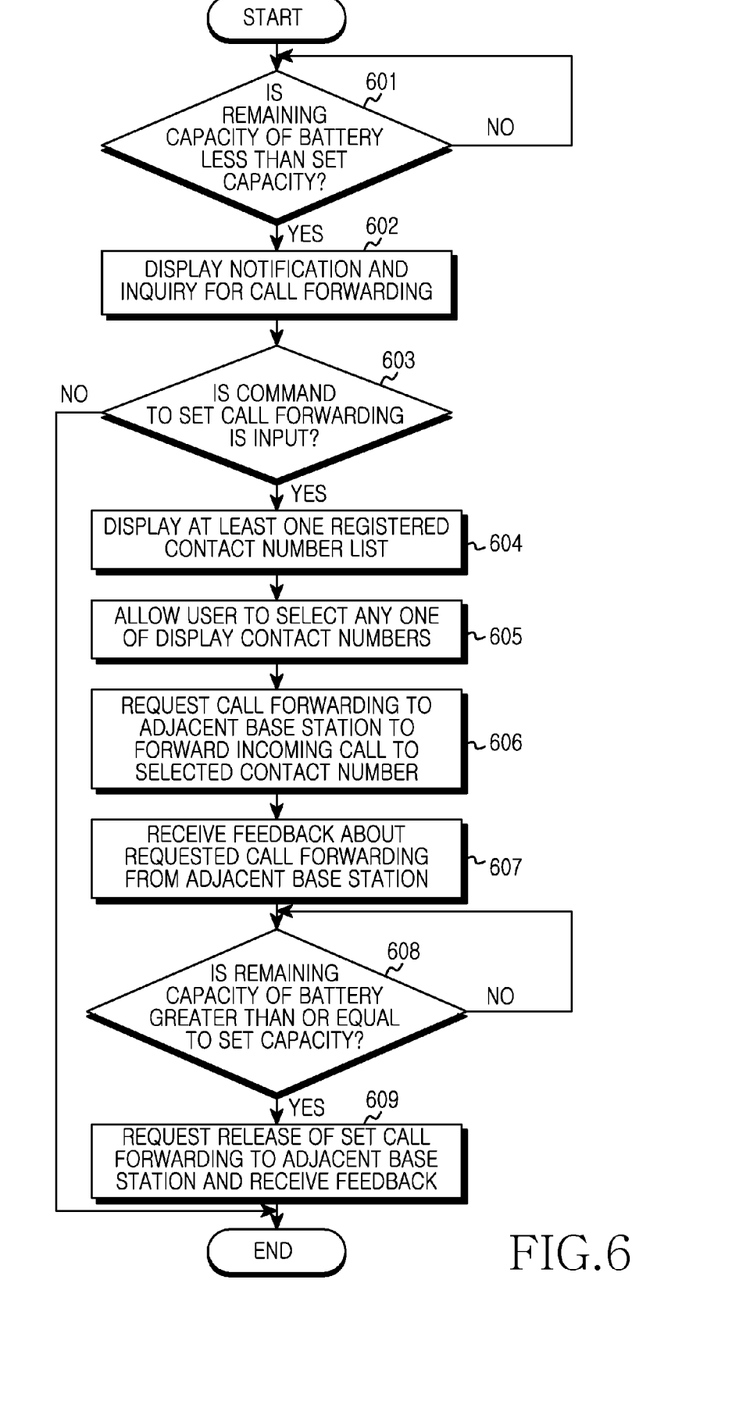
FIG. 6 is a flowchart illustrating a method for setting a call forwarding function according to an embodiment of the present invention.

FIG. 6 is a flowchart illustrating a method for setting a call forwarding function according to an embodiment of the present invention.

Referring to FIG. 6, the electronic device determines whether a remaining battery capacity is less than a threshold, e.g., 30%, in step 601.

When the remaining battery capacity is less than 30% in step 601, the electronic device displays an inquiry to the user for setting call forwarding in step 602. For example, when the remaining battery capacity is less than 30%, the electronic device may display notification information including information indicating that the remaining battery capacity is less than 30% and information indicating that a user may set a call forwarding function.

In step 603, the electronic device determines whether a command to set the call forwarding function is input.

When it is determined that the command to set the call forwarding is input in step 603, the electronic device displays a contact number list in step 604, e.g., as illustrated in FIG. 2C.

In step 605, the electronic device receives a user selection of one of the displayed contact numbers, e.g., as illustrated in FIG. 2C.

In step 606, the electronic device sends a request for call forwarding to an adjacent base station, and in step 607, the electronic device receives feedback information about the requested call forwarding from the adjacent base station, which can be displayed and/or audibly output.

In step 608, the electronic device determines whether the remaining battery capacity is now greater than or equal to 30%, e.g., every 10 minutes.

When it is determined that the remaining capacity of the battery is greater than or equal to 30% in step 608, the electronic device sends a request to release the call forwarding to the adjacent base station and receives feedback information from the adjacent base station in step 609.

Figure 7:
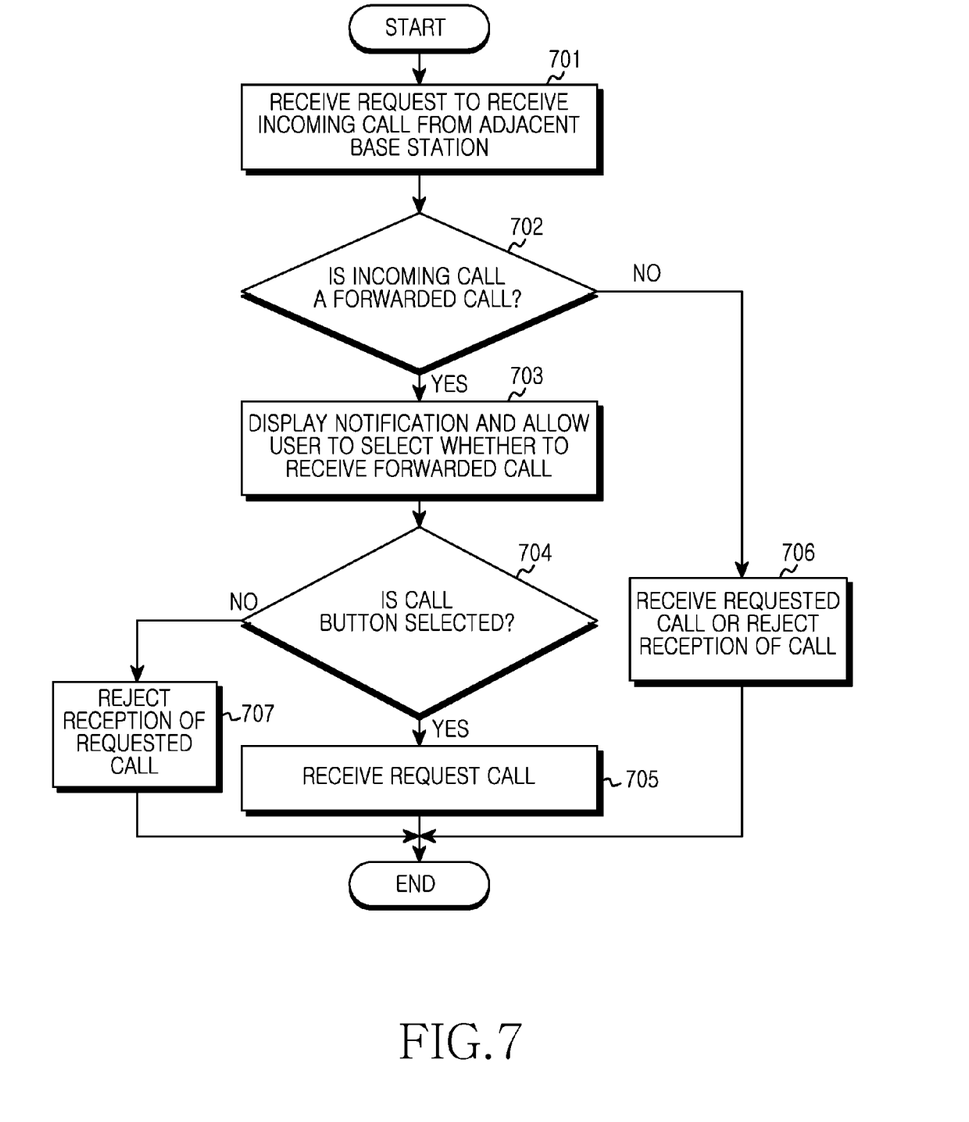
FIG. 7 is a flowchart illustrating a method for receiving a call when a call forwarding function is set according to an embodiment of the present invention.

FIG. 7 is a flowchart illustrating a method for receiving a call when a call forwarding function is set according to an embodiment of the present invention.

Referring to FIG. 7, an electronic device receives an incoming call from an adjacent base station in step 701.

In step 702, the electronic device determines whether the incoming call is a forwarded call in step 702.

If it is determined that the incoming call is a forwarded call in step 702, the electronic device displays notification information including information indicating the call is a forwarded call and displays a call button for accepting the forwarded call and a reject button for rejecting the forwarded call, e.g., as illustrated in FIGS. 4A and 5A, in step 703.

In step 704, the electronic device determines whether the call button or the reject button is selected.

When the call button is selected in step 704, the electronic device receives the forwarded call in step 705.

When the call button is not selected, i.e., the reject button is selected, in step 704, the electronic device rejects the forwarded call in step 707.

If it is determined that the incoming call is not a forwarded call in step 702, the electronic device operates normally, i.e., receives or rejects the incoming call in step 706.

Figure 8A:
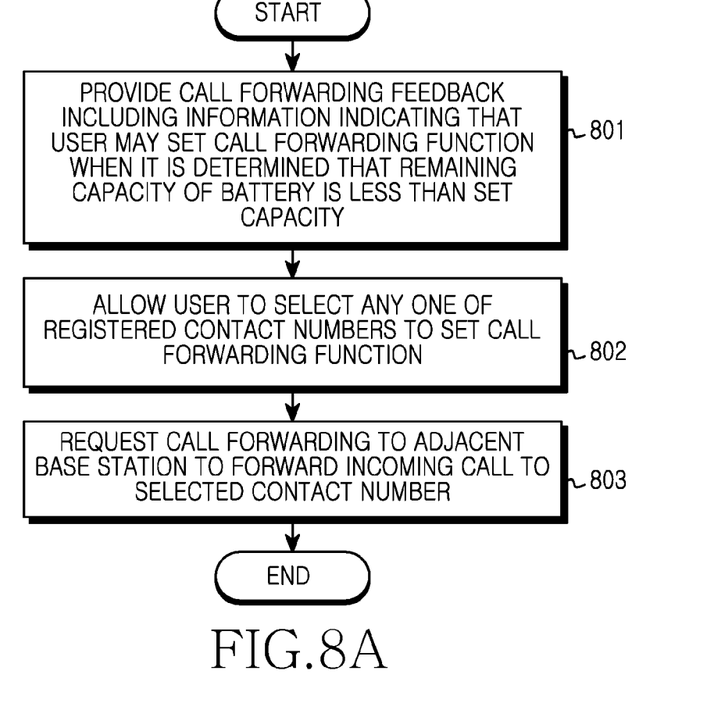
FIGS. 8A and 8B are flowcharts illustrating an operation method of an electronic device for forwarding an incoming call according to the remaining capacity of its battery, according to embodiments of the present invention.

FIG. 8A is a flowchart illustrating an operation method of an electronic device for forwarding an incoming call according to the remaining capacity of its battery according to one embodiment of the present invention.

First of all, as shown in FIG. 8A, when it is determined that the remaining capacity of its battery is less than set capacity, the electronic device may provide call forwarding feedback including information indicating that a user may set a call forwarding function (step 801). In more detail, when it is determined that the current remaining capacity of the battery is less than the set capacity, the electronic device may display notification information including information indicating that the remaining capacity of the battery is less than the set capacity and information indicating that the user may set the call forwarding function and simultaneously reproduce the above-described notification information through its speaker.

The electronic device may allow the user to select any one of registered contact numbers to set the call forwarding function (step 802). In more detail, when it is determined that a command to set the call forwarding function is input, the electronic device may display at least one registered list and allow the user to select any one contact number on the displayed contact number list.

The electronic device may request the call forwarding to an adjacent base station to forward an incoming call to the selected contact number (step 803). For example, if the call forwarding function is set to a contact number provided to an "A", the electronic device may request the call forwarding to the adjacent base station to forward an incoming call to the contact number provided to the "A". The electronic device may receive feedback about the requested call forwarding from the adjacent base station. For example, the electronic device may receive the feedback about the call forwarding from the adjacent base station, display a notification message indicating that the call forwarding function is set to the contact number provided to the "A", and simultaneously reproduce contents of the above-described notification message through its speaker.

Figure 8B:
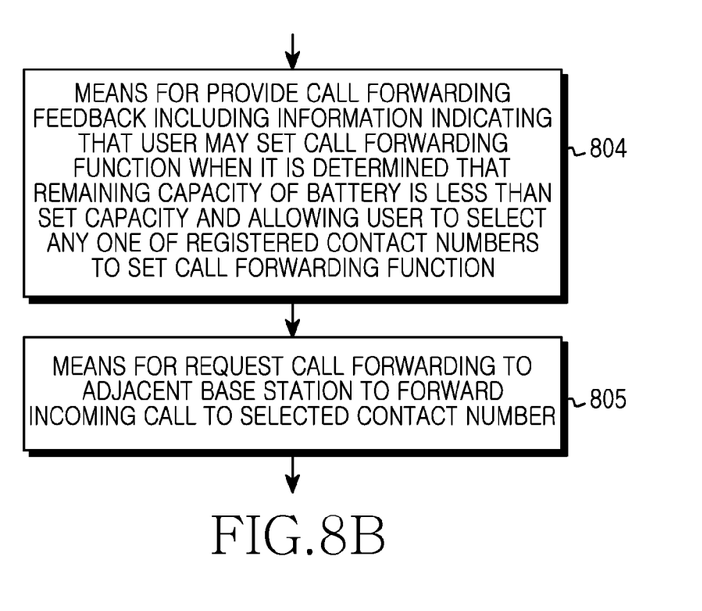

FIG. 8B is a block diagram illustrating configuration of an electronic device for forwarding an incoming call according to the remaining capacity of its battery according to one embodiment of the present invention.

First of all, as shown in FIG. 8B, when it is determined that the remaining capacity of its battery is less than set capacity, a means 804 of the electronic device, that is, a touch screen of the electronic device may provide call forwarding feedback including information indicating that a user may set a call forwarding function and allow a user to select any one of registered contact numbers to set the call forwarding function. In more detail, when it is determined that the current remaining capacity of the battery is less than the set capacity, the touch screen of the electronic device may display notification information including information indicating that the remaining capacity of the battery is less than the set capacity and information indicating that the user may set the call forwarding function and simultaneously reproduce the above-described notification information through its speaker. Also, when it is determined that a command to set the call forwarding function is input, the touch screen of the electronic device may display at least one registered list and allow the user to select any one contact number on the displayed contact number list.

A means 805 of the electronic device, that is, a communication module of the electronic device may request the call forwarding to an adjacent base station to forward an incoming call to the selected contact number. For example, if the call forwarding function is set to a contact number provided to an "A", the communication module of the electronic device may request the call forwarding to the adjacent base station to forward an incoming call to the contact number provided to the "A". The communication module of the electronic device may receive feedback about the requested call forwarding function from the adjacent base station.

Figure 9A:
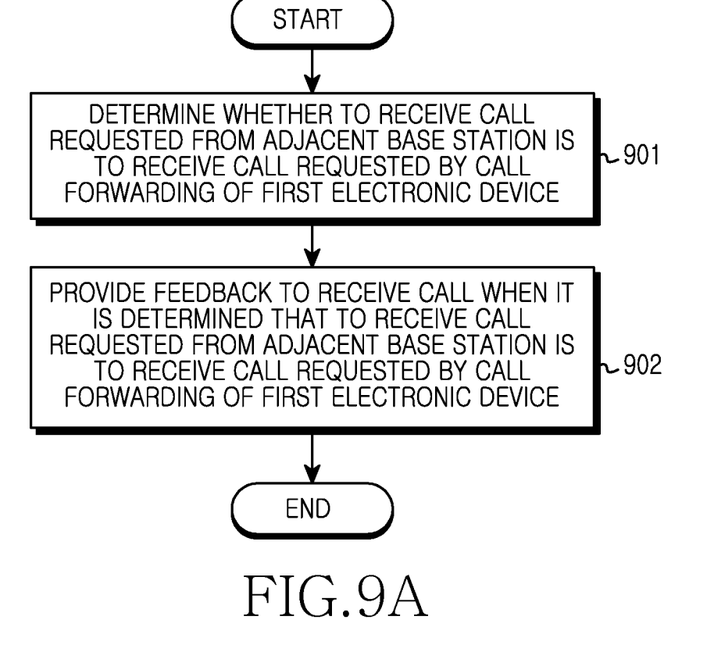
FIGS. 9A and 9B are flowcharts illustrating an operation method of an electronic device to which an incoming call is forwarded, according to embodiments of the present invention.

FIG. 9A is a flowchart illustrating an operation method of an electronic device to which an incoming call is forwarded according to one embodiment of the present invention.

First of all, the electronic device may determine whether to receive a call requested from an adjacent base station is to receive a call by call forwarding of a first electronic device (step 901). For example, if an incoming call is forwarded from an electronic device of an "A user" to the electronic device, the electronic device may determine whether to receive a call requested from the adjacent base station is to receive a call by the call forwarding of the electronic device of the "A user".

When it is determined that to receive the call requested from the adjacent base station is to receive the call by the call forwarding of the first electronic device, the electronic device may provide feedback to receive the call (step 902). In more detail, the electronic device may display notification information including information indicating that a call to be requested to the electronic device of the "A user" is forwarded by the call forwarding and simultaneously reproduce information indicating that the call is forwarded by the call forwarding through it speaker. Also, the electronic device may display a call button for attempting to call and a reject button for rejecting a telephone call together with a set region of the notification information.

Figure 9B:
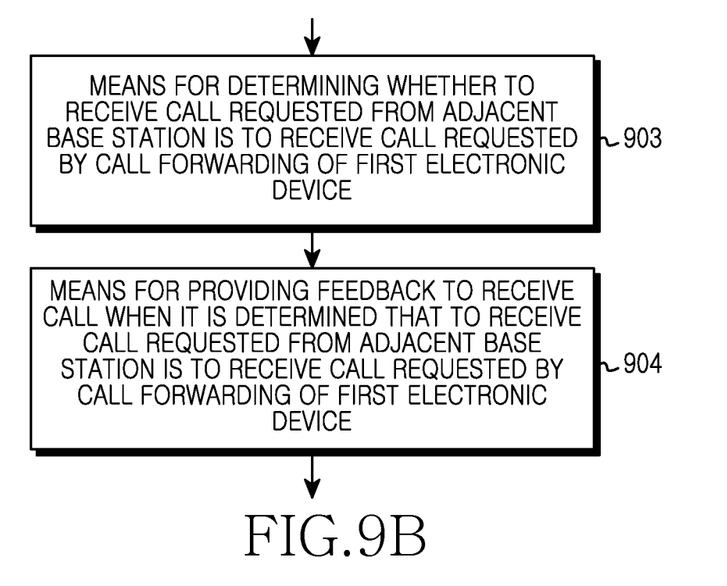

FIG. 9B is a block diagram illustrating configuration of an electronic device to which an incoming call is forwarded according to one embodiment of the present invention.

First of all, as shown in FIG. 9B, a means 903 of the electronic device, that is, a processor unit of the electronic device may determine whether to receive a call requested from an adjacent base station is to receive a call by call forwarding of a first electronic device. For example, if an incoming call is forwarded from an electronic device of an "A user" to the electronic device, the processor unit of the electronic device may determine whether to receive a call requested from the adjacent base station is to receive a call by the call forwarding of the electronic device of the "A user".

When it is determined that to receive the call requested from the adjacent base station is to receive the call by the call forwarding function of the first electronic device, a means 904 of the electronic device, that is, a touch screen of the electronic device may provide feedback to receive the call. In more detail, the touch screen of the electronic device may display notification information including information indicating that a call to be requested to the electronic device of the "A user" is forwarded by the call forwarding function. A speaker of the electronic device may reproduce information indicating that the call is forwarded by the call forwarding function. Also, the touch screen of the electronic device may display a call button for attempting to call and a reject button for rejecting a telephone call together with a set region of the notification information.

Figure 10:
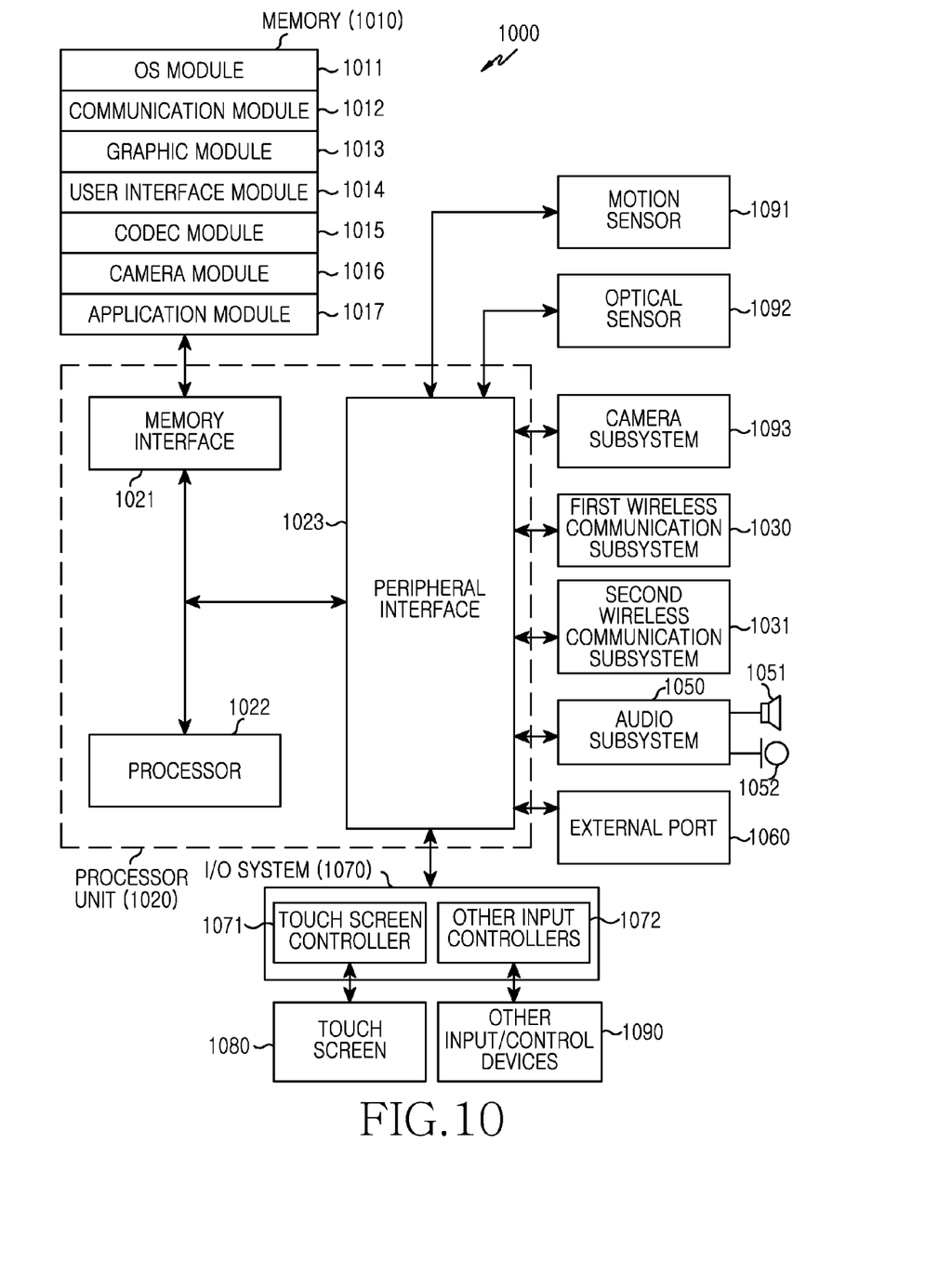
FIG. 10 is a block diagram illustrating an electronic device according to an embodiment of the present invention.

FIG. 10 is a block diagram illustrating an electronic device according to an embodiment of the present invention.

Referring to FIG. 10, the electronic device 1000, e.g., a portable terminal, a mobile phone, a mobile pad, a media player, a tablet computer, a handheld computer, or a Personal Digital Assistant (PDA), includes a memory 1010, a processor unit 1020, a first wireless communication subsystem 1030, a second wireless communication subsystem 1031, an external port 1060, an audio subsystem 1050, a speaker 1051, a microphone 1052, an Input/Output (I/O) system 1070, a touch screen 1080, other input/control devices 1090, a motion sensor 1091, an optical sensor 1092, and a camera subsystem 1093. The memory 1010 and the external port 1060 may be a plurality of memories and external ports, respectively.

As described above, the speaker 1051 audibly reproduces information indicating that a user may set a call forwarding function and information indicating that a call is forwarded by call forwarding.

The processor unit 1020 includes a memory interface 1021, a processor 1022, and a peripheral interface 1023. In some cases, the whole processor unit 1020 is referred to as a processor. The processor unit 1020 determines whether a remaining battery capacity of the electronic device 1000 is less than threshold, before setting call forwarding, and determines whether the remaining battery capacity is greater than or equal to the threshold, when call forwarding is set. The processor unit 1020 also determines whether to receive a forwarded call, e.g., based on a user input through the touch screen 1080 or other input/control devices 1090.

The processor 1022 executes several software programs and performs several functions for the electronic device 1000. Also, the processor 1022 performs process and control for voice and data communication. In addition to these normal functions, the processor 1022 plays a role in executing a specific software module (instruction set) stored in the memory 1010 and performing several specific functions corresponding to the module. That is, the processor 1022 interworks with software modules stored in the memory 1010 and performs embodiments of the present invention.

The processor 1022 may include one or more data processors, an image processor, or a codec. The processor 1022 may separately include the data processors, the image processor, or the codec. Also, the processor 1022 may include several processors for performing different functions. The peripheral interface 1023 connects the I/O system 1070 of the electronic device 1000 and several peripheral devices to the processor 1022 and the memory 1010 (through the memory interface 1021).

A variety of components of the electronic device 1000 may be coupled by one or more communication buses (not written in reference numbers) or stream lines (not written in reference numbers).

The external port 1060 is used to connect a portable electronic device (not shown) to another electronic device directly or connect it to another electronic device indirectly through a network (e.g., the Internet, an intranet, a wireless Local Area Network (LAN), etc.). For example, the external port 1060 may be, but is not limited to, a Universal Serial Bus (USB) port, a firewire port, etc.

The motion sensor 1091 and the optical sensor 1092 may connect to the peripheral interface 1023 and may perform several functions. For example, the motion sensor 1091 and the optical sensor 1092 may connect to the peripheral interface 1023, sense motion of the electronic device 1000, and may sense light from the outside.

The camera subsystem 1093 may perform a camera function like a photo and video clip recording function.

The optical sensor 1092 may be a Charge Coupled Device (CCD) or a Complementary Metal-Oxide Semiconductor (CMOS) device.

A communication function is performed through the first and second wireless communication subsystems 1030 and 1031. For example, each of the first and second wireless communication subsystems 1030 and 1031 may include a radio frequency receiver and transceiver and/or a beam (e.g., infrared ray) receiver and transceiver. The first communication subsystem 1030 and the second communication subsystem 1031 may be classified according to a communication network through which the electronic device 1000 communicates. For example, the communication network may be, but is not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a Wireless Fidelity (Wi-Fi) network, a WiMax network, or/and a Bluetooth network. Each of the first and second communication subsystems 1030 and 1031 may include a communication subsystem designed to be operated through the communication network. The first and second wireless communication subsystems 1030 and 1031 may be combined and configured as one wireless communication subsystem.

The audio subsystem 1050 may connect to the speaker 1051 and the microphone 1052 and may be responsible for inputting and outputting an audio stream, such as a voice recognition function, a voice copy function, a digital recording function, and a phone call function.

The I/O system 1070 may include a touch screen controller 1071 and/or other input controllers 1072. The touch screen controller 1071 may be coupled to the touch screen 1080. The touch screen 1080 and the touch screen controller 1071 may detect, but is not limited to, contact and motion or stop of them using not only capacitive, resistive, infrared ray, and surface acoustic wave technologies for determining one or more contact points with the touch screen 1080 but also a certain multi-touch sensing technology including other proximity sensor arrangement or other elements. The other input controllers 1072 may be coupled to the other input/control devices 1090. The other input/control devices 1090 may be pointer devices such as one or more buttons, a rocket switch, a thumb-wheel, a dial, a stick, and/or a stylus.

The touch screen 1080 provides an input/output interface between the electronic device 1000 and the user. That is, the touch screen 1080 transmits touch input of the user to the electronic device 1000. Also, the touch screen 1080 is a medium for displaying output from the electronic device 1000 to the user. That is, the touch screen 1080 displays visual output to the user. This visual output has a text type, a graphic type, a video type, and a combined type of them.

The touch screen 1080 may be any one of several displays, e.g., a Liquid Crystal Display (LCD), a Light Emitting Diode (LED), a Light emitting Polymer Display (LPD), an Organic Light Emitting Diode (OLED), an Active Matrix Organic Light Emitting Diode (AMOLED), or a Flexible LED (FLED).

The touch screen 1080 according may provide call forwarding feedback including information indicating that the user may set the call forwarding function when the remaining battery capacity is less than a threshold and instructs the user to select any one of registered contact numbers to set the call forwarding function. Also, the touch screen 1080 displays notification information including information indicating that the remaining capacity of the battery is less than the threshold and information indicating that the user may set the call forwarding function. Also, the touch screen 1080 may receive a command to set the call forwarding function, display a contact number list, and allow the user to select any one of the displayed contact numbers. Also, the touch screen 1080 may provide feedback to allow the user to select whether to receive a call when to receive a call requested from an adjacent base station is to receive a call requested by the call forwarding of a first electronic device. Also, the touch screen 1080 may display notification information including information indicating that a call to be requested to the first electronic device is forwarded by the call forwarding, and allow the user to select a first region included in displayed notification information, and allow the user to select a second region included in the displayed notification information.

The memory 1010 may be coupled to the memory interface 1021. The memory 1010 may include a high-speed Random Access Memory (RAM) such as one or more magnetic storages, a non-volatile memory, one or more optical storages, and/or a flash memory (e.g., a NAND flash memory or a NOR flash memory).

The memory 1010 stores software components. The software components include an Operating System (OS) module 1011, a communication module 1012, a graphic module 1013, a user interface module 1014, a CODEC module 1015, a camera module 1016, one or more application modules 1017, etc. Also, the modules which are the software components may be expressed in a set of instructions. Accordingly, the modules are expressed in an instruction set. Also, the modules are expressed in programs.

The OS module 1011 (e.g., an embedded OS such as Windows, Linux, Darwin, RTXC, UNIX, OS X, or VxWorks) includes several software components for controlling a general system operation.

The communication module 1012 may communicate with other electronic devices such as a computer, a server, and/or a portable terminal through the first and second wireless communication subsystems 1030 and 1031 or the external port 1060. The communication module 1012 may send a request for the call forwarding to an adjacent base station and receive feedback about the requested call forwarding from the adjacent base station. Also, the communication module 1012 may request a release of the call forwarding to the adjacent base station and receive feedback about the requested release of the call forwarding from the adjacent base station. Also, the communication module 1012 may receive a request to receive at least a call from the adjacent base station and verify that a first region is selected, and receive the requested call.

The graphic module 1013 includes several software components for providing and displaying graphics on the touch screen 1080.

The user interface module 1014 includes several software components related to a user interface. The user interface module 1014 includes contents about whether a state of a user interface is changed to any state, whether a state of a user interface is changed in any condition, etc.

The CODEC module 1015 may include software components related to encoding and decoding of video files. The CODEC module 1015 may include a video stream module such as an MPEG module and/or an H204 module. Also, the CODEC module 1015 may include a code module for several audio files such as AAA files, AMR files, and WMA files. Also, the CODEC module 1015 includes an instruction set corresponding to one embodiment of the present invention.

The camera module 1016 includes camera1-related software components capable of performing camera-related processes and functions.

The application module 1017 includes a browser function, an email function, an instant message function, a word processing function, a keyboard emulation function, an address book function, a touch list function, a widget function, a Digital Right Management (DRM) function, a voice recognition function, a voice copy function, a position determining function, a location based service function, etc.

A variety of functions of the electronic device 1000, which are described above or to be described later, may be executed by one or more streaming processing, hardware including an Application Specific Integrated Circuit (ASIC), software, and/or combination of them.

While the present invention has been particularly shown and described with reference to certain embodiments thereof, it will be understood by those skilled in the art that various changes in form and details may be made therein without departing from the spirit and scope of the present invention as defined by the appended claims and any equivalents thereof.

What is claimed is:

1. A method for setting call forwarding in an electronic device based on a remaining battery capacity, the method comprising:
   determining that the remaining battery capacity is below a threshold;
   providing an indication that the remaining battery capacity is below the threshold and that a call forwarding function may be set;
   receiving an input from a user to select a contact number;
   sending, to an adjacent base station, a request for call forwarding an incoming call to the selected contact number;
   periodically determining whether the remaining battery capacity is greater than or equal to the threshold, if the call forwarding is set; and
   sending, to the adjacent base station, a request to release the call forwarding, if it is determined that the remaining battery capacity is greater than or equal to the threshold.

2. The method of claim 1, further comprising audibly reproducing the indication that the remaining battery capacity is below the threshold.

3. The method of claim 1, wherein receiving the input from the user comprises:
   receiving a command to set the call forwarding function;
   displaying a contact number list including the contact number; and
   receiving a user selection of the contact number included in the contact list.

4. The method of claim 1, further comprising receiving, from the adjacent base station, feedback in response to the request for the call forwarding.

5. The method of claim 1, further comprising receiving, from the adjacent base station, feedback information in response to the request to release the call forwarding.

6. An electronic device comprising:
   a processor for determining that a remaining battery capacity is below a threshold, and for periodically determining whether the remaining battery capacity of the is greater than or equal to the threshold, if the call forwarding is set;
   a touch screen for providing an indication that the remaining battery capacity is below the threshold and that a call forwarding function may be set, and for receiving an input from a user to select a contact number; and
   a communication module for sending, to an adjacent base station, a request for call forwarding an incoming call to the selected contact number, and for sending, to the adjacent base station, a request to release the call forwarding, if it is determined that the remaining battery capacity is greater than or equal to the threshold.

7. The electronic device of claim 6, further comprising a speaker for audibly reproducing the indication that the remaining battery capacity is below the threshold.

8. The electronic device of claim 6, wherein the touch screen receives a command to set the call forwarding function, displays a contact number list including the contact number, and receives a user selection of the contact number included in the contact list.

9. The electronic device of claim 6, wherein the communication module receives, from the adjacent base station, feedback in response to the request for the call forwarding.

10. The electronic device of claim 6, wherein the communication module receives, from the adjacent base station, feedback information in response to the request to release the call forwarding.

* * * * *